Aug. 9, 1966     KUNIO ATSUMI ET AL     3,265,172

CUSHIONED TORQUE-LIMITING CENTRIFUGAL CLUTCH

Filed April 20, 1964     2 Sheets-Sheet 1

INVENTORS
KUNIO ATSUMI and HIROSHI WADA

BY E. M. Squire their attorney

Aug. 9, 1966   KUNIO ATSUMI ET AL   3,265,172
CUSHIONED TORQUE-LIMITING CENTRIFUGAL CLUTCH
Filed April 20, 1964                                2 Sheets-Sheet 2

INVENTOR.
KUNIO ATSUMI and HIROSHI WADA
BY E. M. Squire
their attorney

United States Patent Office 3,265,172
Patented August 9, 1966

3,265,172
CUSHIONED TORQUE-LIMITING
CENTRIFUGAL CLUTCH
Kunio Atsumi, Hamamatsu-shi, Shizuoka-ken, and Hiroshi Wada, Hamana-gun, Shizuoka-ken, Japan, assignors to Suzuki Motor Co., Ltd., Shizuoka-ken, Japan, a corporation of Japan
Filed Apr. 20, 1964, Ser. No. 361,140
Claims priority, application Japan, Apr. 26, 1963, 38/30,847/63; July 18, 1963, 38/54,091/63; Aug. 13, 1963, 38/60,908/63
6 Claims. (Cl. 192—55)

The present invention relates to a cushioned torque-limiting centrifugal clutch which is suitable for use in a motorcycle or the like.

The clutch comprises a driving member which is driven directly by the internal combustion engine of the motorcycle and a driven member which is connected through the usual change speed transmission to the driven wheel. Driving and driven friction discs are pressed into engagement by centrifugal balls. The balls are prevented from exerting pressure on the friction discs until a predetermined minimum engine speed is exceeded. The pressure between the discs is limited by a series of compression springs so that torque exceeding a maximum value is dissipated by slippage between the friction discs. A torque cushion formed by a group of resilient rubber blocks is interposed between the driven friction discs and the driven output member. Sudden changes in torque are absorbed by the cushioning blocks and if the peak torque exceeds a predetermined maximum value, it produces clutch slippage.

Various objects and advantages of the present invention will appear from the following description of a preferred form thereof, reference being had to the accompanying drawings, in which, FIG. 1 is a side elevational view in axial section of a clutch embodying the invention.

Figure 1:
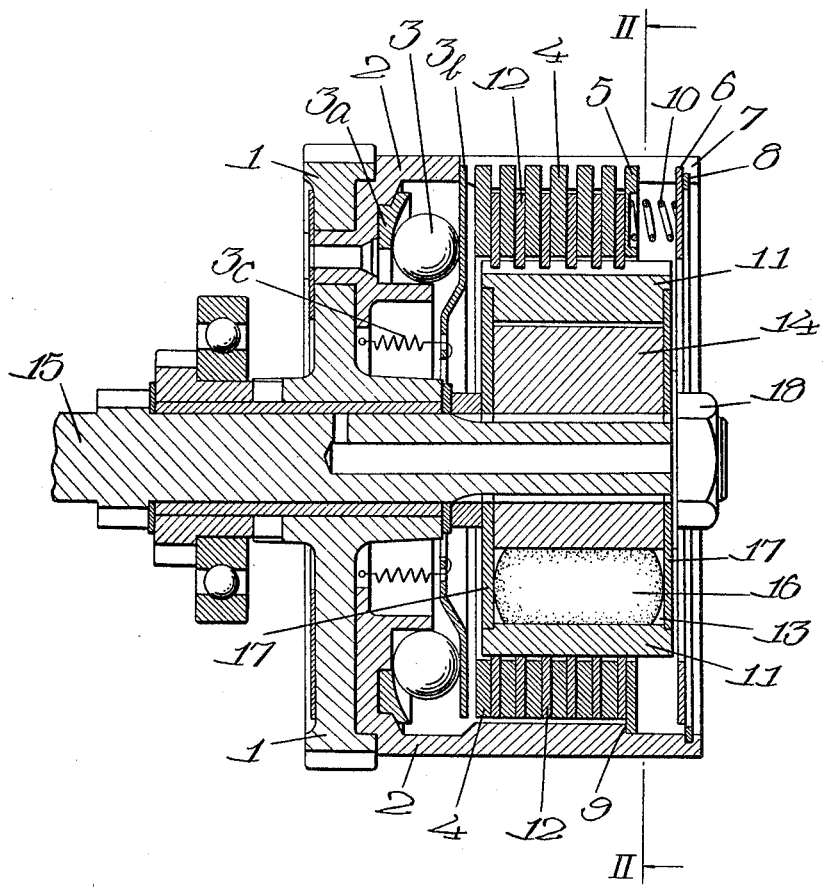
Figure 2:
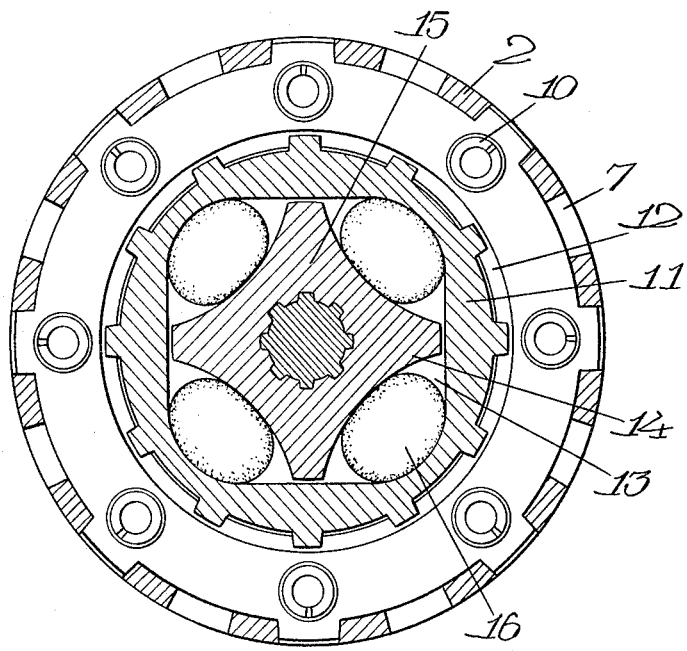
FIG. 2 is a transverse sectional view taken on the line II—II in FIG. 1.

One embodiment of the present invention will now be described with reference to the drawings. 1 designates a primary gear meshing with primary pinion (not shown) fast on the crank shaft of an internal combustion engine. 2 denotes a clutch housing fixed to the primary gear 1. Steel balls 3 are disposed within the clutch housing 2 and engage a frusto-conical member 3a. Driving friction plates 4 and an end spring plate 5 revolve as a unit with the clutch housing 2 being freely slidable in the axial direction by engagement in an axially extending slot 7 formed in the clutch housing 2. A compression plate 3b is interposed between the steel balls 3 and an end one of the driving friction plates 4 so that the steel balls do not directly press against and damage the end driving friction plate 4. The compression plate 3b is yieldingly urged away from the end friction plate by springs 3c which regulate the minimum speed required for initial radial displacement of the steel balls 3. A stop ring 8 is engaged in the slot 7. A shoulder 9 formed on housing 2 limits displacement of the spring plate 5 toward the steel balls 3. Clutch springs 10 urge the spring plate 5 into engagement with the shoulder 9. A driven sleeve hub 11 is splined to drive driven friction plates 12. A square hole 13 is formed in the sleeve hub 11. A generally square sleeve 14 is fast on a driven shaft 15. A cushion consisting of four rubber blocks 16 is provided. The blocks 16 are compressed and inserted between corners of the square hole 13 and the sides of the square sleeve 14. The blocks 16 constitute a resilient cushioning and damping device. The blocks 16 are axially confined between side plates 17, the plates 17 being held by a nut 18.

Figure 3:
FIG. 3 is an elevation of a rubber block in large scale.

Each rubber block 16 is so dimensioned that the diameter of the central portion is slightly larger than the end portions as shown in FIG. 3. By virtue of this shape, lateral compressive stress of the rubber block, when deformed, is reduced at its end portions and axial elongation is also reduced so that fracture due to elongation is prevented.

The side plates 17 abut against both sides of the square sleeve 14, and partially overlie both sides of the sleeve hub 11 thereby preventing axial elongation of the resilient block 16. In the centrifugal friction clutch described above, the contacting surfaces of the rubber blocks 16 and the sleeve hub 11 and the square sleeve 14 are made slidable by the interposition of oil. This results in a tendency for the rubber blocks to be squeezed out in the axial direction from between the sleeve hub 11 and the square sleeve 14, but this is prevented by the side plates 17. In the case of a dry system, the contacting parts of the rubber block 16 and the sleeve hub 11 and the square sleeve 14 are subjected to intense friction and the rubber blocks 16 cannot be elongated in the axial direction. Therefore each rubber block 16 expands at its end face which is not in contact with the sleeve hub 11 and the square sleeve 14 and is likely to split at the edges of its ends. This end expansion of each rubber block 16 is restricted by the side plates 17 which prevent this damage. If the sleeve hub 11 is supported on the square sleeve 14 only by the rubber blocks 16, there may be eccentricity with respect to the sleeve hub. This is prevented by the side plates 17 which are centered on the splines of the shaft 15 and which fit into circular recesses on the sides of the sleeve hub 11.

When the primary gear 1 is driven by an internal combustion engine, the radial centrifugal force acting on the steel balls 3 produces an axial force by engagement with the conical member 3a and press the driving friction plates 4 against the driven friction plates 5, this force being applied directly to the plate 3b. While the speed of the internal combustion engine and thus the primary gear 1 are slow, the centrifugal force of the steel balls 3 is small and accordingly the force is insufficient to overcome the pull of the clutch springs 3c and plate 3b remains stationary. If the engine speed is increased and the pressure on the clutch discs 4, 12 is increased exceeding the pressure the clutch springs 10, the clutch springs 10 are compressed and the maximum pressure on the clutch discs 4, 12 is limited by the clutch springs 10. As the engine speed is further increased the steel balls 3, compress the clutch springs 10, the maximum pressure being limited by engagement of the balls 3 with the inner peripheral wall of the clutch housing a. However, even if the engine speed is more accelerated, the disc pressure does not increase beyond this maximum nor does the slippage torque of the clutch.

The torque of the internal combustion engine is transmitted through the primary gear 1, the clutch housing 2, the driving friction plates 4, the driven friction plates 12, the sleeve hub 11 and the rubber blocks 16 to the driven shaft 15 and is further transmitted through the speed change gear (not shown) to the wheel. The shock occurring in the transmission system can be absorbed either by a rolling compression of the rubber block or by a slippage between the both friction plates according to the degree of the shock. This construction protects the parts of the propulsion system and ensures smooth operation for the driver. The clutch can be made small and light in weight and is simple to manufacture and to install.

While we have shown and described what we believe to be the best embodiments of our invention, it will be apparent to those skilled in the art that various changes and modifications may be made therein without departing from the spirit and scope of the invention as defined in the append claims.

What is claimed is:

1. In a clutch having driving and driven members, torque transmitting cushioning and damping means interposed between said members, said cushioning and damping means comprising: a first rotatable torque member driven by said driving member and a second rotatable torque member coaxial with said first torque member and driving said driven member, said torque members defining therebetween a plurality of symmetrically arranged axially extending open-ended chambers, each chamber being of uniform transverse cross-sectional area throughout its entire length, said area being decreased by relative angular displacement between said torque members in the direction urged by torque transmission through said clutch; an elongated resilient cushioning member confined in each of said chambers, each cushioning member being enlarged intermediate its ends whereby the central portion of each cushioning member is compressed to a greater extent than its end portions when the cross-sectional area of its confining chamber is decreased; and closure means connected for rotation with said torque members and closing the ends of all of said chambers for limiting longitudinal expansion of said cushioning members, said closure means permitting said relative angular displacement between said torque members.

2. Cushioning and damping means according to claim 1, wherein said closure means comprises means maintaining said torque members coaxially positioned with respect to each other.

3. Cushioning and damping means according to claim 1, further comprising a lubricant interposed between each cushioning member and the walls of its confining chamber.

4. A clutch comprising: a hollow cylindrical driving member to receive torque from an engine for transmission through said clutch; a driven shaft coaxial with said driving member for delivering torque transmitted through said clutch; a first torque member coaxial with said driving member; a series of interengaging friction discs, alternate ones of said friction discs being axially displaceably connected to said driving member for rotation coaxially therewith, the discs engaging said alternate discs being axially displaceably connected to said first torque member for rotation therewith; a second torque member connected for rotation coaxially with said driven shaft, said torque members defining therebetween a plurality of symmetrically arranged axially extending open-ended chambers, each chamber being of uniform transverse cross-sectional area throughout its entire length, said area being decreased by relative angular displacement between said torque members in the direction urged by torque transmission through said clutch; an elongated resilient cushioning member confined in each of said chambers, each cushioning member being enlarged intermediate its ends, whereby the central portion of each cushioning member is compressed to a greater extent than its end portions when the cross-sectional area of its confining chamber is decreased; closure means connected for rotation with said torque members and closing the ends of all of said chambers for limiting longitudinal expansion of said cushioning members, said closure means permitting said relative angular displacement between said torque members and maintaining said torque members coaxially positioned with respect to each other; a plurality of balls confined within said driving member; an annular ramp concentric with said driving member and engaging said balls; an annular pressure plate axially displaceable by said balls during radially outward movement thereof in engagement with said ramp, said pressure plate applying a first force to the disc at one end of said series, said first force being axially directed toward the other end of said series; means limiting outward movement of said balls; and spring means engaging the disc at the other end of said series and applying a second force thereto which yieldingly opposes said first force, the maximum pressure of interengagement of said discs being limited by said second force.

5. A clutch according to claim 4, further comprising a lubricant interposed between each cushioning member and the walls of its confining chamber.

6. A clutch according to claim 4, further comprising threshold spring means exerting an axially directed force on said pressure plate opposing said first force, said threshold spring means preventing displacement of said pressure plate when the speed of said engine is less than a predetermined threshold speed.

References Cited by the Examiner

UNITED STATES PATENTS

| 1,757,517 | 5/1930 | Eaton | 192—55 |
| 1,803,077 | 4/1931 | Spase | 192—55 |
| 2,712,742 | 7/1955 | Neidhart | 64—14 |
| 2,721,639 | 10/1955 | Miller | 192—109 |

FOREIGN PATENTS

| 1,197,697 | 6/1959 | France. |
| 921,119 | 12/1954 | Germany. |

DAVID J. WILLIAMOWSKY, *Primary Examiner.*